United States Patent
Meister

(10) Patent No.: US 7,754,264 B2
(45) Date of Patent: Jul. 13, 2010

(54) PROCESS FOR PREPARING NUTRITIONAL PRODUCTS

(75) Inventor: Niklaus Henri Meister, Grosshoechstetten (CH)

(73) Assignee: Nestec S.A., Vevey (CH)

( * ) Notice: Subject to any disclaimer, the term of this patent is extended or adjusted under 35 U.S.C. 154(b) by 550 days.

(21) Appl. No.: 11/815,063

(22) PCT Filed: Jan. 31, 2005

(86) PCT No.: PCT/EP2005/050393

§ 371 (c)(1),
(2), (4) Date: Aug. 30, 2007

(87) PCT Pub. No.: WO2006/079420

PCT Pub. Date: Aug. 3, 2006

(65) Prior Publication Data

US 2008/0187635 A1    Aug. 7, 2008

(51) Int. Cl.
*A23L 1/302* (2006.01)
*A23L 1/304* (2006.01)

(52) U.S. Cl. ............ 426/471; 426/311; 426/455; 426/465; 426/648; 426/650; 426/658; 426/661

(58) Field of Classification Search ............ 426/311, 426/455, 465, 471, 650, 658, 661
See application file for complete search history.

(56) References Cited

U.S. PATENT DOCUMENTS

| 3,324,567 A | 6/1967 | Franck |
| 3,896,240 A | 7/1975 | Gruette et al. |
| 2003/0124228 A1* | 7/2003 | Goto et al. ............ 426/99 |
| 2004/0043043 A1 | 3/2004 | Schlyter et al. |

FOREIGN PATENT DOCUMENTS

| EP | 0 334 617 | 9/1989 |
| GB | 1 168 692 | 10/1969 |
| WO | WO 01/62098 | 8/2001 |
| WO | WO 02/06538 | 1/2002 |

OTHER PUBLICATIONS

International Search Report (3 pgs.).

* cited by examiner

*Primary Examiner*—Helen F Pratt
(74) *Attorney, Agent, or Firm*—K&L Gates LLP

(57) ABSTRACT

A process for preparing a dehydrated carbohydrate-containing nutritional product comprises preparing a liquid concentrate with a reduced carbohydrate content, spraying the liquid concentrate into a spray-drier and incorporating the remainder of the carbohydrate content into the nutritional product by blowing solid carbohydrate particles into the spray dryer and removing the carbohydrate-containing nutritional product from the spray-drier. The process substantially reduces the problem of fouling of the spray dryer.

9 Claims, 1 Drawing Sheet

PROCESS FOR PREPARING NUTRITIONAL PRODUCTS

FIELD OF THE INVENTION

This invention relates to a process for preparing carbohydrate-containing nutritional products by spray-drying. The carbohydrate-containing nutritional products may be milk-based powders which contain milk ingredients; such as infant formulas, milk powders, functional milk powders, and the like.

BACKGROUND OF THE INVENTION

Milk-based powders have traditionally been produced by preparing a liquid concentrate of all the ingredients making up the powder. The liquid concentrate is then transported to a spray drier and dried to powder. This process is often known as a wet-mix process. Powders produced by this process are usually homogeneous and dissolve rapidly. However, if the liquid concentrate contains carbohydrates, the carbohydrates tend to cake in the spray-drier, causing fouling. The caked carbohydrates are extremely difficult to remove. This may cause significant cleaning downtime. For example, it may in certain circumstances by necessary to clean the spray dryer every 24 to 48 hours. A further problem may occur with certain carbohydrates such as starch which swell when in contact with water and produce a very viscous liquid concentrate which cannot easily be sprayed into the dryer. Also, if it is desired to include heat sensitive ingredients in the final product and such ingredients are added to the liquid concentrate, they will begin to degrade during the spray drying process so that it is necessary to overdose these constituents in order to be sure that a sufficient amount will remain in the final product. This is clearly undesirable from an economic point of view. One example of a heat sensitive ingredient is Vitamin C.

To overcome these problems, it is now common to produce milk-based powders in two stages. In the first stage, a base powder is produced from a liquid concentrate by spray drying. The base powder will contain most of the ingredients of the final product. However, the base powder has reduced levels of carbohydrates and heat sensitive ingredients. After the base powder has been produced, the remaining carbohydrates and any heat sensitive ingredients are added by dry mixing. The dry-mix process reduces the problems of fouling in the dryer and solves the problem of degradation of heat sensitive ingredients. However, powders produced by the dry-mix process are much less homogeneous. In particular, after storage and transport the lack of homogeneity may be visible to the naked eye. In addition to this aesthetic disadvantage, a technical consequence of the lack of homogeneity is that powders produced by dry mixing do not dissolve as rapidly or as completely as those produced by wet mixing of all constituents.

There is therefore a need for a process for producing carbohydrate-containing nutritional products by spray drying which results in products with a good structure but with reduced levels of fouling in the spray-drier.

SUMMARY OF THE INVENTION

Accordingly this invention provides a process for preparing a dehydrated carbohydrate-containing nutritional product, the process comprising preparing a liquid concentrate with a reduced carbohydrate content, spraying the liquid concentrate into a spray-drier and incorporating the remainder of the carbohydrate content into the nutritional product by blowing solid carbohydrate particles into the spray dryer and removing the carbohydrate-containing nutritional product from the spray-drier.

In this context "reduced carbohydrate content" means reduced by comparison with the carbohydrate content of the final product and "remainder of the carbohydrate content" means the difference between the carbohydrate content of the liquid concentrate and the carbohydrate content of the final product.

Where quantities are specified in percentages, this means percentage by weight unless otherwise stated.

The invention provides the advantage of producing a powder which has a good powder structure while reducing caking and fouling in the spray-drier. Hence the process results in improved efficiency, greater capacity and reduced downtime.

DETAILED DESCRIPTION OF THE INVENTION

Figure 1A:
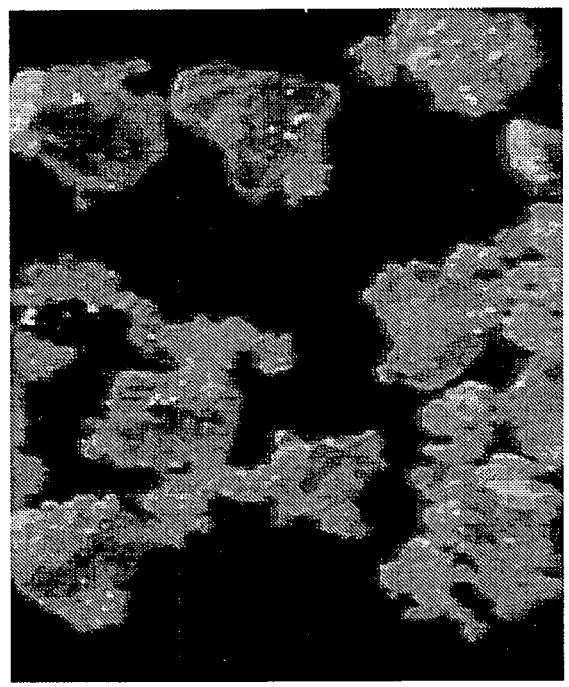
FIG. 1a shows the structure of the powder produced in Example 1 under magnification

As is apparent from the foregoing, in the process of the invention, the carbohydrate content of the final product is reached in two stages. The liquid concentrate has a reduced carbohydrate content by comparison with the final product. For example, up to 40% of the carbohydrate content of the final product, typically from 20 to 30%, may be added by blowing into the spray dryer. Depending upon the composition of the final product, the carbohydrate added by blowing may be a proportion of all the carbohydrates in the product. Suitable carbohydrates include sucrose, lactose, maltodextrin, maltose, corn syrup, corn syrup solids, rice syrup solids, starch, and the like. The exact carbohydrate or carbohydrate mixture introduced by blowing of solid particles will depend upon the powder being produced. For example, it may be the entire content of one specific carbohydrate. This latter approach is particularly advantageous in the case of so-called anti-regurgitation infant formulas which contain starch as a thickener. If the starch is added to the wet mix, not only does it contribute to the problem of fouling of the spray dryer but also it reduces the viscosity of the liquid concentrate to such an extent that the speed of the spray drying operation is substantially reduced. Therefore, in the case of anti-regurgitation formulas or other spray dried nutritional products containing starch, it is particularly advantageous to add all the starch as solid particles of pre-gelatinised starch via blowing.

The location in the spray dryer at which the solid carbohydrate particles are introduced is not critical although it will be necessary to pay due regard to the possibility of increasing the risk of explosion due to introduction of solid particles into an environment where hot air is also introduced. However, the techniques to manage the risks of explosion in spray dryers are well known to those skilled in the art. Preferably, the solid carbohydrate particles are introduced into the spray dryer in the zone of turbulence of the spray dryer. The precise location of this zone varies with the type of spray dryer but again the location and extent of the zone of turbulence of any given spray dryer will be well known to those skilled in the operation of that spray dryer. Alternatively, the carbohydrate particles my be introduced into the exhaust air ducts of the spray dryer, a region that is notorious for developing excessive fouling.

Once introduced into the spray-drier, the solid carbohydrate particles agglomerate with the drying particles of the liquid concentrate to produce a homogeneous final product.

Most spray dryers are equipped with apparatus to allow the re-introduction of so-called fines into the spray dryer. Fines are particles produced in the spray dryer that are smaller than desired for the final product resulting, for example, from the breakdown of agglomerated particles produced by spray drying. It has for many years been the practice to collect these small particles for example by filtration and blow them back into the spray dryer to re-agglomerate with newly introduced liquid concentrate. This process is known as "blowing back". If a spray dryer is equipped with apparatus for blowing back fines, this apparatus may advantageously also be used for introduction of the solid carbohydrate particles according to the process of the present invention.

To produce a dehydrated nutritional product according to the process of the present invention, the ingredients are separated into ingredients for wet-processing and ingredients for dry-processing, processed separately and then combined in the spray-drier.

The wet processed ingredients are processed up to the spray-drier in the usual manner. For example, the wet ingredients are standardised, evaporated, homogenised, and sprayed into the top of the spray-drier. Suitable standardisation, homogenisation and spray-drying processes and equipment are well known to the person skilled in the art.

If the nutritional product is a milk-based powder such as growing up milk, instant milk powder, or functional milk powder, a standardised milk is prepared. The standardisation is carried out to provide a desired fat to non-fat solids ratio. This standardisation is generally carried out by adding the appropriate amount of skimmed milk to fresh whole milk. However, standardisation can also be effected by composing suitable liquids from fresh whole milk, partially skimmed milk, cream, butterfat, buttermilk etc. Standardisation of milk can also be carried out from milk powder, skim milk powder, butter oil or vegetable oils with the appropriate amount of water. Additional wet ingredients may then be added to the standardised milk. Typical wet ingredients include emulsifiers, lipids, and vitamins and minerals which are not heat sensitive. If it is desired to produce an infant formula or healthcare formula, a standardised blend is prepared from a protein source (for example, milk proteins such as casein and whey) and a lipid source. Again the standardisation is carried out to provide a desired fat to non-fat solids ratio. Additional wet ingredients are then added to the standardised formula. Typical wet ingredients include emulsifiers, lipids, and vitamins and minerals which are not heat-sensitive.

If necessary, after standardisation the wet ingredients may be thermally treated to reduce bacterial loads. This may be carried out by steam injection or by heat exchanger; for example a plate heat exchanger. The wet ingredients may then be cooled; for example by flash cooling.

The wet ingredients may then be evaporated in the usual manner to produce a liquid concentrate with a solids content above about 20%; for example about 30 to about 40%, preferably about 35%. If it is desired to further increase the solids content of the liquid concentrate, the liquid concentrate may be homogenised, in one or two stages, preferably in two stages and then further evaporated to reach a solids content of 50% or more. A suitable process to achieve this high solids content in the liquid concentrate is described in WO 01/62098, the disclosure of which is incorporated by reference.

Once evaporation is complete, the liquid concentrate is spray-dried. This may be carried out by spraying the liquid concentrate into the top of a spray-drier, preferably with high pressure swirl nozzles. The atomisation pressure is typically between about 50 to about 300 bar, preferably about 120 to about 170 bar with the hot air being introduced at a temperature between 175 and 400° C., preferably between 280 and 360° C. Suitable spray-driers and spray-drying conditions are well known.

Suitable blowing equipment may be used to transport the dry ingredients into the spray-drier. Air blowers are particularly suitable. Otherwise the dry ingredients may be mechanically transported to the spray-drier.

Other dry ingredients may also be incorporated in the final product by blowing solid particles thereof into the spray dryer with the carbohydrate particles. Suitable ingredients include vitamins such as Vitamin C, minerals such as iron, zinc and copper in the form of their respective sulphates and flavourings such as vanilla. There may be various reasons for choosing to add such ingredients in this way. With heat sensitive components such as Vitamin C, the degradation that will inevitably occur if the ingredient is added during wet mixing and then subjected to heat in the evaporation and introduction into the spray dryer can be minimised. Minerals such as those listed above tend to oxidise any lipid component in the nutritional product. Again, such undesirable reactions can be minimised by adding such minerals in this way. As far as flavourings are concerned, addition in this way reduces cross-contamination of subsequent unflavoured or differently flavoured products and reduces the requirement to clean the spray dryer.

It will be appreciated that as the carbohydrate content of the product is being added in two stages in the context of a continuous manufacturing process, it will be necessary to ensure that appropriate quantities of solid carbohydrate particles are blown into the spray dryer. This may be achieved for example by monitoring the solids content of the liquid concentrate entering the spray dryer and the rate at which the liquid concentrate enters the spray dryer in real time and using this information to control the rate of introduction of the solid carbohydrate particles accordingly. Various types of process control equipment suitable for this purpose exist and are well known to the skilled person.

The products obtained from the spray-drier have very good properties. In particular, the powders have wettability and solubility properties comparable to those produced by the traditional wet-mix process and superior to those produced by the dry-mix process. Further, the powders are homogeneous and tend not to settle out into different components during storage and transportation. Also, the spray-drier is subjected to significantly less fouling. In the case of milk-based powders in particular, the formation of advanced glycation end products and lysine blockage will be reduced for two reasons. Firstly, at least a portion of the carbohydrate is kept separate from the protein components of the powder for most of the process. Secondly, use of the process of the present invention enables the rate of the spray drying process to be increased because of the reduction in fouling. This means that the temperature in the spray dryer is lower for a given temperature of hot air introduced into the dryer because there is a greater total mass of liquid present. By this means, the operating temperature in the dryer may be 10° C. or more below those encountered in conventional processes with a resulting decrease in lysine blockage in the case of milk based powders such as infant formulas.

The carbohydrate-containing nutritional powders which may be produced by the process are any suitable powders such as infant formulas, growing up milks, instant milk powders, functional milks, healthcare formulas, soups, sauces and the like. The powders may be milk-based powders which contain milk ingredients but may also be soy-based powders or vegetable based powders.

Embodiments of the invention are now described for the purposes of illustration only.

EXAMPLE 1

A honey flavoured growing up milk powder sold under the trade mark Neslac® is prepared. Fresh liquid milk is standardised and mixed with the other wet mix ingredients:—honey, Raftilose® fructo-oligosaccharides, lactose and calcium citrate. This mixture is standardised and then a mixture of butter oil and vegetable oil is added and the mixture is standardised again. The mixture is then subjected to evaporation in a standard manner to provide a liquid concentrate with a solids content of approximately 40%. Thereafter, the concentrate is subjected to two stage homogenisation followed by further evaporation to reach a solids content of between 55 and 60% and is then sprayed into the top of a spray-drier through nozzles at a pressure of between 120 and 160 bar. At the same time, hot air is blown into the dryer at a temperature of between 280° C. and 310° C. The drier is otherwise operated under standard conditions.

A powder mix made up of maltodextrin, sucrose, vitamins and minerals is blown into the spray-drier at a position about 5 m from the top. The growing up milk powder is collected from the bottom of the spray-drier.

The powder is examined and has an agglomerated, homogeneous structure with a density of about 510 g/l.

In this example it may be seen that it is the entire content in the product of the carbohydrates sucrose and maltodextrin that is incorporated in the product according to the process of the present invention. The carbohydrate content of the product additionally includes lactose which is incorporated in the product via the liquid concentrate.

Figure 1B:
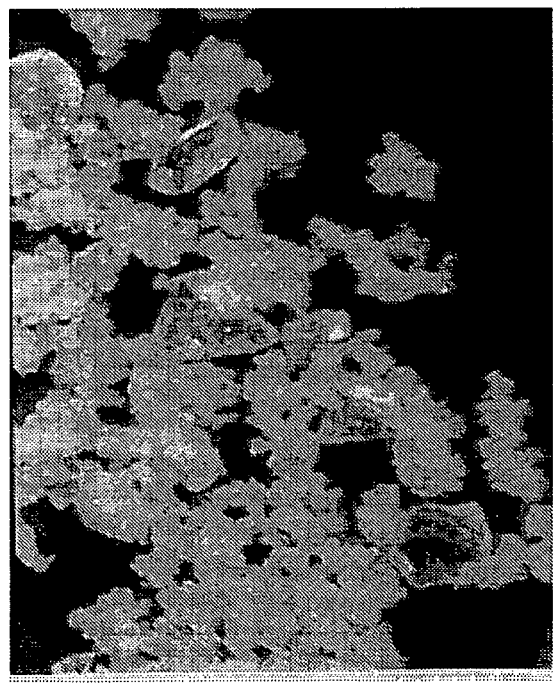
FIG. 1b shows the structure of a powder with the same composition but produced by dry mixing.

The powder is then compared to an powder produced by spray drying the same liquid concentrate and adding the same proportions of maltodextrin, sucrose, vitamins and minerals by dry-mixing. The powder has a density of about 580 g/l Referring now to the drawings, FIG. 1a shows powder produced by the process of the present invention as described above and FIG. 1b shows powder with the same composition but produced by dry mixing, in each case under magnification. As may clearly be seen from a comparison of the Figures, the structure of the powder of FIG. 1a is substantially more homogeneous.

The wettability, miscibility and state of dissolution of the two powders are measured by standard techniques and the results are shown below and it is found that the powder made by the process of the present invention has substantially improved wettability leading to improved solubility in both cold and warm water. Other powder properties are similar.

The process is run for a period of several months and production efficiencies calculated. It is found that the process results in increased line capacity of up to 15% as compared to the dry-mix process and up to 150% as compared to a full wet-mix process (up to 300% in the case of products containing starch when all the starch is incorporated according to the process). These improvements result primarily from reduced cleaning down-time due to reduced fouling and caking in the spray-drier. However, the elimination of a separate dry-mixing step allowing a continuous manufacturing process to be employed also contributes to the improved efficiency.

EXAMPLE 2

Samples of the infant formula sold under the trade mark Lactogen® which contains the carbohydrates lactose, maltodextrin and sucrose are manufactured using the process of the present invention to incorporate the maltodextrin and the sucrose and conventionally using dry mixing to incorporate the maltodextrin and the sucrose. The level of lysine blockage in the two samples is measured and found to be 9.49% in the sample produced according to the process of the present invention and 11.08% in the sample produced by dry mixing.

The invention claimed is:

1. A process for preparing a dehydrated carbohydrate-containing nutritional product, comprising preparing a liquid concentrate with a reduced carbohydrate content, spraying the liquid concentrate into a spray-drier and incorporating a remainder of the carbohydrate content into the liquid concentrate by blowing solid carbohydrate particles into the spray-dryer and removing a resulting carbohydrate-containing nutritional product from the spray-drier.

2. A process as claimed in claim 1, wherein not more than 40% of the carbohydrate content of the nutritional product is blown into the spray dryer.

3. A process as claimed in claim 1, wherein from 20 to 30% of the carbohydrate content of the nutritional product is blown into the spray dryer.

4. A process as claimed in claim 1 wherein the entire content of a specific carbohydrate in the nutritional product is blown into the spray dryer.

5. A process as claimed in claim 4, wherein the specific carbohydrate is pre-gelatinized starch.

6. A process as claimed in claim 1 wherein the carbohydrate powder is blown into the spray dryer in the zone of turbulence of the spray dryer.

7. A process as claimed in claim 1 wherein the spray dryer is equipped with a blow back apparatus and the carbohydrate particles are introduced into the spray dryer by means of the blow back apparatus.

8. A process as claimed in claim 1 wherein at least one component selected from the group consisting of vitamins and minerals are incorporated in the nutritional product by being blown into the spray dryer with the carbohydrate particles.

9. A process as claimed in claim 1 wherein the solids content of the liquid concentrate is at least 50%.

* * * * *